Dec. 22, 1925.  
A. H. FROST ET AL  
APPARATUS FOR PRODUCING RUBBER ARTICLES  
Filed Nov. 13, 1922  
1,566,666
3 Sheets-Sheet 2
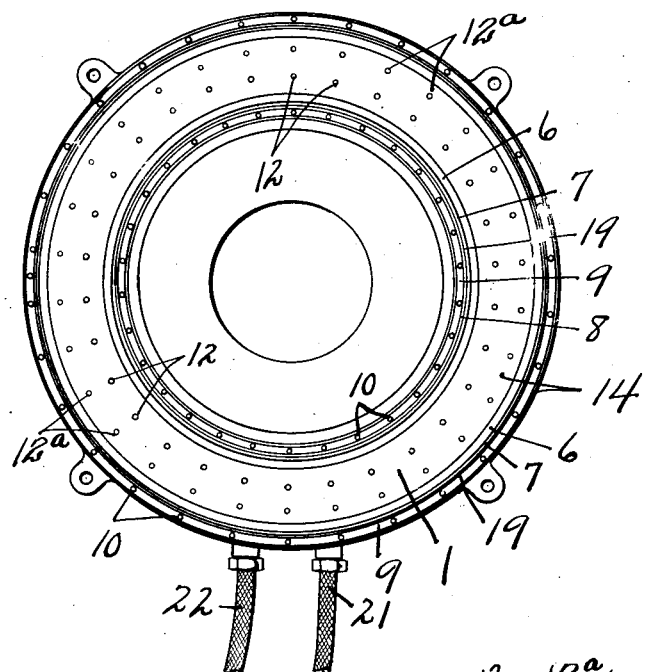
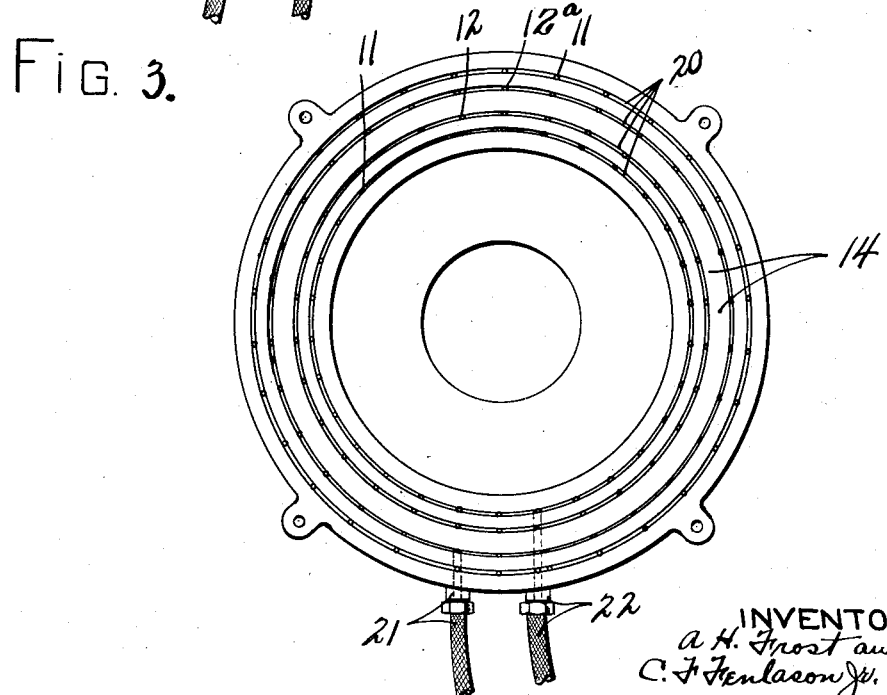

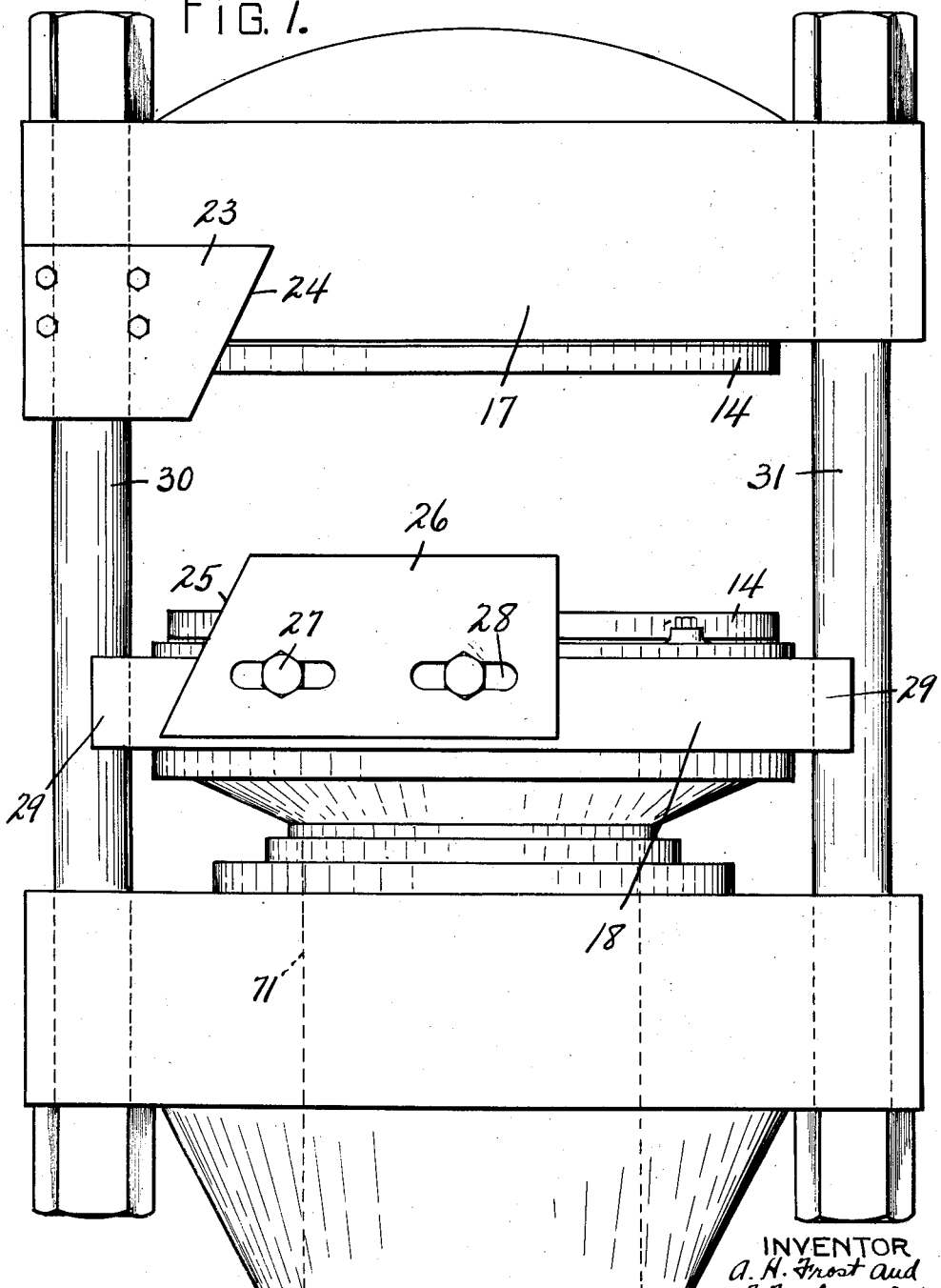

Dec. 22, 1925.  1,566,666
A. H. FROST ET AL
APPARATUS FOR PRODUCING RUBBER ARTICLES
Filed Nov. 13, 1922  3 Sheets-Sheet 3
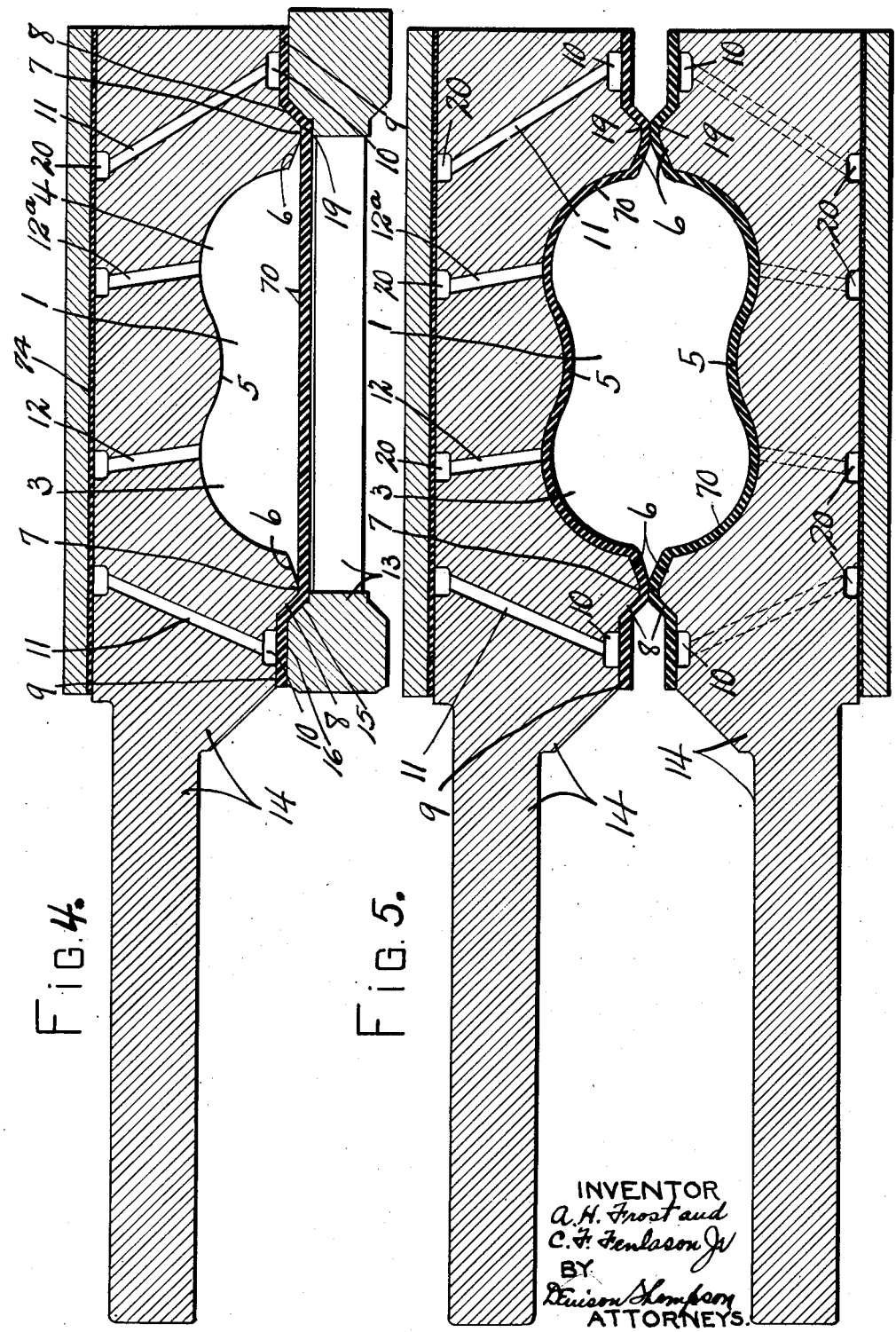
INVENTOR
A. H. Frost and
C. F. Fenlason Jr
BY
Denison Thompson
ATTORNEYS.

Patented Dec. 22, 1925.

1,566,666

UNITED STATES PATENT OFFICE.

ALLEN H. FROST AND CHARLES FRED FENLASON, JR., OF MALONE, NEW YORK.

APPARATUS FOR PRODUCING RUBBER ARTICLES.

Application filed November 13, 1922. Serial No. 600,643.

*To all whom it may concern:*

Be it known that we, ALLEN H. FROST and CHARLES F. FENLASON, Jr., of Malone, in the county of Franklin, in the State of New York, have invented new and useful Improvements in Apparatus for Producing Rubber Articles, of which the following, taken in connection with the accompanying drawings, is a full, clear, and exact description.

This invention relates to a certain new and novel method and apparatus for manufacturing rubber tubes, and is particularly designed for the production of inner tubes of automobile tires and other vehicles.

The main object of the invention is the production of a rubber tube of improved characteristics, including a more uniformly and effectively cured rubber having a longer life, greater tensile strength and increased wearing qualities, such tube being manufactured by a new and improved method effecting economy in cost of production combined with more rapid manufacture.

The invention, briefly speaking, contemplates the production of a rubber tube by the homogeneous incorporation of the opposite edges of two vacuum-stretched mold-shaped annular pieces of rubber, one into the other, to form an endless tube of a substantially smooth and unbroken exterior contour, and the vulcanizing of that tube in a manner adapted to produce an article of the most efficient and valuable character.

Other objects and advantages relate to the details of the process, and the specific structure of the apparatus, all as will more fully appear from the following description, taken in connection with the accompanying drawings, in which:—

Figure 1 is an elevation of a portion of an ordinary press in connection with which our mold sections are adapted to be assembled for effecting the production of a rubber tube from two annular sheets of rubber.

Figure 2 is a plan view of the operating or inner surface of the mold section.

Figure 3 is a top plan view of one of the mold sections.

Figure 4 is a sectional view on line 4—4, Figure 2, illustrating the method of temporarily maintaining the annular rubber sheet in desired position in connection with the mold, so that the vacuum utilized will stretch the rubber into the shape of the mold without movement of the edges of the sheet which results in folds and wrinkles.

Figure 5 is a sectional view illustrating the complementary mold sections in pressing position for homogeneously incorporating the edge portions of two annular sheets, one into the other, to form the tube.

In this process, as illustrated in the drawings, a tube is formed from two annular or ring-shaped sheets of uncured rubber. This uncured rubber may be of the desired composition, and may be produced in any of the well known manners, as by compounding or blending prime washed smoked sheets with chemicals, and then if desired compounding the rubber so produced with rubber scrap all in a manner well known, in accordance with the desired characteristic of the product.

It will be obvious that altho our process contemplates the utilization of such compounded or blended uncured rubber, yet a wide variation in that respect is possible. These annular sheets of rubber are assembled with mold sections of peculiar form and construction, and this is effected in a new and novel manner. A radial section of one of these molds is shown in Figure 4. Each of these mold sections may, as illustrated, be of annular or ring-shaped form, their operating portions being of a circumference and suitably arranged to produce a tube of the desired size.

As illustrated, each mold section has a concavity —1— which in effect constitutes two concavities —3— and —4— by reason of the central rib or undulation —5— which rises in the concavity —1— to produce in effect two annular grooves of curved formation merging into each other along arcuate lines at the curved apex of the rib or undulation —5—. At the inner and outer edges of the concavity —1— the mold section is formed with inclined surfaces —6— terminating in comparatively short substantially horizontal flat surfaces —7—, which flat surfaces —7— form annular cutting edges by reason of the oppositely inclined surfaces —8—, which surfaces lead to flattened portions —9— at the inner and outer peripheries of the mold. There are passageways —11— leading through the mold to the flat surfaces —9— which may be provided with depressions —10— for exposing a considerable surface of the rubber sheet to the vacuum produced by the withdrawal of air through the conduits —11— when the rubber sheet is in place as hereinafter described.

There are other conduits —12— and —12ᵃ— leading to the two annular grooves of the concavity —1— which are adapted for the withdrawal of air therethrough and from the concavity —1— whereby the sheet —70— of rubber, when positioned as shown in Figure 4, and held in position by the clamping frame —13—, as illustrated in Figure 4, will be drawn into the concavity —1— and shaped to the mold.

In operation the rubber sheet is placed upon the clamping frame —13— or upon mold section —14— so that the inclined surfaces —15— of the clamping frame conform with the inclined surfaces —8— of the mold, and the flattened surfaces —16— of the clamping frame conform with the flattened surfaces —9— of the mold, so that when the clamping frame —13— is pressed against the rubber sheet —70—, its edges will be tightly held in position, as indicated in Figure 4.

Then when the vacuum is applied or the air withdrawn thru the tubes —11— and —12—, the rubber sheet —70— will be drawn into the concavity —1—, and will conform itself to the concavity by its elasticity, while the edge portions or peripheries of the sheet may be clamped between the frame —13— and the inner and outer perimeters of the mold, so that the rubber sheet is conformed to the mold by stretching rather than by mere shaping, which latter may involve folds and wrinkling.

The upper and lower mold sections are preferably of the same shape, form and construction, and the annular sheets —70— of rubber are applied to these mold sections in the same manner by the utilization of the clamping frame —13—. These mold sections are preferably supported, as indicated in Figure 1, the one upon the press head —17— and the other upon the press plate —18—. When the rubber sheets have been applied to the mold sections and are being held in proper position with respect to the co-acting pressing surfaces of said sections, the press plate may be raised in the usual manner by means of the ram or plunger —71— to bring the mold sections into contact under such high pressure, and in such a manner as to grind, mix and homogeneously unite the edge portions of the sheet of rubber while the cutting edges —19— clip off the portions of the rubber sheet —70— that lie outside the concavity —1— or the portion of the mold constituted by the surfaces —6— and —7—, which surfaces —6— and —7— press together and homogeneously incorporate the edges of one sheet into the other sheet, so that there remains within the mold an endless tube of rubber which may be termed a "biscuit."

The mold sections, as shown, may be provided with annular grooves, —20—, in this particular instance, four in number, conforming to the conduits thru the molds and thru which the vacuum is applied or the air withdrawn from the mold sections. The concentric rows of conduits are in communication with the annular grooves —20—, as illustrated in Figure 3. As shown, a vacuum pipe —21— is connected to the two outer annular grooves, while a vacuum pipe —22— is connected to the two inner annular grooves —20—. The annular grooves or air channels —20— in the sections —14— may be formed in any suitable manner and as illustrated, are in the form of annular channels covered by a gasket —74— which may be secured in position in any suitable way, as for instance by contact with the mold sections —17— or —18— or by a separate plate, if desired, secured to the mold section —14— in any suitable manner, not necessary to herein further describe.

It will, however, be obvious that the air may be withdrawn from the conduits —11—, —12— and —12ᵃ— in any suitable manner, and by other constructions and connections than those shown.

For the purpose of more thoroughly incorporating the edges of one of the rubber sheets in the contacting edge of the other, preferably a slight rotary movement is given one of the mold sections during the pressing operation, and this may be effected, as indicated in Figure 1, by forming the press head —17— with a bevel surface which may be constituted by a plate —23— connected to the press head —17—, which plate is formed with an inclined or beveled surface —24— for contact with the surface —25— upon plate —26— secured to the press plate —18— in an adjustable manner, as by bolts —27— extending through slots —28—, as indicated, whereby upon contact of the surface —24— with the surface —25—, and during the upward movement of the press plate, a slight rotary movement of the press plate will be effected, and such rotary movement is permitted by somewhat loose relation between the bearings —29— upon the press plate and the standards —30— and —31— upon which the bearing slides. Only a slight rotary movement is necessary to effect the desired results, and the plate —26— may be adjusted to effect that desired movement and the bearings —29— can easily and readily be so formed with respect to the standards —30— and —31— to permit such movement, as indicated. The endless tube produced in the manner described and by the use of the apparatus described, may be removed from the forming molds preliminary to vulcanization in any suitable manner, as by the process described in co-pending application filed of even date herewith.

Altho we have shown and described a specific method of forming an endless rubber tube, together with a specific apparatus involving details of construction, as constituting a preferred embodiment of our invention, we do not desire to limit ourselves to the apparatus or of the method, as various changes and modifications may be made within the scope of the appended claims.

We claim:

1. In an apparatus for forming endless tubes of rubber, two cooperating annular mold sections, means for bringing said mold sections into pressing co-action, and means for causing a rotary movement of one of said sections while in pressing co-action with the other section.

2. In an apparatus for forming endless tubes of rubber, an annular mold section having an annular concavity bordered by inclined surfaces terminating in relatively flat surfaces provided with comparatively sharp cutting edges, and means for bringing two of such mold sections into pressing relation and for simultaneously causing a relative rotary movement of said sections.

3. In an apparatus for forming endless tubes of rubber, an annular mold section having an annular concavity bordered by inclined surfaces terminating in relatively flat surfaces provided with comparatively sharp cutting edges, surfaces extending from said cutting edges which are inclined in directions opposite to the inclination of the adjacent bordering surface, and means for bringing two of such mold sections into pressing relation and for simultaneously causing a relative rotary movement of said sections.

4. In an apparatus for forming endless tubes of rubber, an annular mold section having an annular concavity bordered by inclined surfaces terminating in relatively flat surfaces provided with comparatively sharp cutting edges, surfaces extending from said cutting edges which are inclined in directions opposite to the inclination of the adjacent bordering surface, substantially flat surfaces extending from said oppositely inclined surfaces, and means for bringing two of such mold sections into pressing relation and for simultaneously causing a relative rotary movement of said sections.

5. In an apparatus for forming endless tubes of rubber, an annular mold section having an annular concavity bordered by inclined surfaces terminating in relatively flat surfaces provided with comparatively sharp cutting edges, conduits extending through the mold section and in communication with said concavity, and means for bringing two of such mold sections into pressing relation and for simultaneously causing a relative rotary movement of said sections.

6. In an apparatus for forming endless tubes of rubber, an annular mold section having an annular concavity bordered by inclined surfaces terminating in relatively flat surfaces provided with comparatively sharp cutting edges, surfaces extending from said cutting edges which are inclined in directions opposite to the inclination of the adjacent bordering surface, substantially flat surfaces extending from said oppositely inclined surfaces, conduits extending through the mold section and in communication with said concavity, other conduits extending through the mold section and terminating at the said flat surface which extends from the oppositely inclined surface, and means for bringing two of such mold sections into pressing relation and for simultaneously causing a relative rotary movement of said sections.

7. A mold section having a plurality of annular grooves in its outer surface and conduits extending from each of said grooves and terminating at the inner surface of the mold, and means for bringing two of such mold sections into pressing relation and for simultaneously causing a relative rotary movement of said sections.

In witness whereof we have hereunto set our hands this thirty-first day of October, 1922.

ALLEN H. FROST.
CHARLES FRED FENLASON, Jr.